(12) United States Patent
Takeuchi et al.

(10) Patent No.: US 11,340,090 B2
(45) Date of Patent: May 24, 2022

(54) VEHICLE CONTROL DEVICE

(71) Applicant: Hitachi Automotive Systems, Ltd., Hitachinaka (JP)

(72) Inventors: Keisuke Takeuchi, Ibaraki (JP); Takashi Tsutsui, Ibaraki (JP)

(73) Assignee: HITACHI ASTEMO, LTD, Hitachinaka (JP)

( * ) Notice: Subject to any disclaimer, the term of this patent is extended or adjusted under 35 U.S.C. 154(b) by 118 days.

(21) Appl. No.: 16/604,983

(22) PCT Filed: Apr. 6, 2018

(86) PCT No.: PCT/JP2018/014676
§ 371 (c)(1),
(2) Date: Oct. 11, 2019

(87) PCT Pub. No.: WO2018/225365
PCT Pub. Date: Dec. 13, 2018

(65) Prior Publication Data
US 2020/0158531 A1 May 21, 2020

(30) Foreign Application Priority Data
Jun. 7, 2017 (JP) .............................. JP2017-112194

(51) Int. Cl.
G01C 21/36 (2006.01)
G05D 1/00 (2006.01)
(Continued)

(52) U.S. Cl.
CPC ..... *G01C 21/3658* (2013.01); *G01C 21/3635* (2013.01); *G05D 1/0088* (2013.01);
(Continued)

(58) Field of Classification Search
CPC ............ G01C 21/3658; G01C 21/3635; G05D 1/0088; G05D 1/0214; G05D 1/0223;
(Continued)

(56) References Cited

U.S. PATENT DOCUMENTS 8,521,352 B1 * 8/2013 Ferguson ............. G05D 1/0212
701/25
2008/0147305 A1 * 6/2008 Kawamata ........ B60W 50/0097
701/117
(Continued)

FOREIGN PATENT DOCUMENTS

EP 3 460 402 A1 3/2019
EP 3 611 469 A1 2/2020
(Continued)

OTHER PUBLICATIONS

International Search Report with English translation and Written Opinion issued in corresponding application No. PCT/JP2018/014676 dated Jul. 31, 2018.
(Continued)

Primary Examiner — Aaron L Troost
(74) Attorney, Agent, or Firm — Foley & Lardner LLP

(57) ABSTRACT

In an automatic driving vehicle, traveling is continued in a case where a section in which a detailed map in which information required for automatic driving is recorded is not usable occurs during the traveling by the automatic driving. Automatic driving control means 100 for controlling automatic driving of a vehicle and map information holding means 601 for holding a detailed map including traveling lane information are provided. In a case where a section in which a detailed map newer than the detailed map held in the map information holding means 601 is not usable is in a traveling scheduled route, the automatic driving control means 100 continues to perform the automatic driving until
(Continued)

a start point of the section is reached, using the detailed map held in the map information holding means 601.

11 Claims, 8 Drawing Sheets

(51) Int. Cl.
  *G05D 1/02* (2020.01)
  *G08G 1/137* (2006.01)
(52) U.S. Cl.
  CPC ......... *G05D 1/0214* (2013.01); *G05D 1/0223* (2013.01); *G08G 1/137* (2013.01); *G05D 2201/0213* (2013.01)
(58) Field of Classification Search
  CPC ........... G05D 2201/0213; G08G 1/137; G08G 1/0967; G06F 16/29
  See application file for complete search history.

(56) References Cited

U.S. PATENT DOCUMENTS

| | | |
|---|---|---|
| 2015/0353088 A1 | 12/2015 | Ishikawa |
| 2017/0122754 A1 | 5/2017 | Konishi et al. |
| 2019/0094855 A1 | 3/2019 | Choi |
| 2020/0110422 A1 | 4/2020 | Takamatsu et al. |

FOREIGN PATENT DOCUMENTS

| | | |
|---|---|---|
| JP | 2003-004468 A | 1/2003 |
| JP | 2015-230573 A | 12/2015 |
| JP | 2017-032421 A | 2/2017 |

OTHER PUBLICATIONS

Extended European Search Report issued in corresponding European Patent Application No. 18813272.4 dated Feb. 19, 2021.

\* cited by examiner

VEHICLE CONTROL DEVICE

TECHNICAL FIELD

The present invention relates to a vehicle control device.

BACKGROUND ART

There is JP 2015-230573 A (PTL 1), as a background technique in the present technical field. The abstract of PTL 1 discloses that "a vehicle-mounted system 100 includes a host vehicle position detection unit 4 that detects a host vehicle position; a vehicle position calculation unit 20; a road condition prediction unit 30 that predicts a road condition at a forward position of the host vehicle, which is ahead of the detected host vehicle position; an automatic driving continuation determination unit 32 that determines whether or not continuation of the automatic driving of the host vehicle is possible at the forward position based on the road condition predicted by the road condition prediction unit 30; and an automatic driving deactivation notice unit 34 which gives notice of deactivation of the automatic driving of the vehicle when the automatic driving continuation determination unit 32 determines that continuation of the automatic driving of the host vehicle is not possible".

CITATION LIST

Patent Literature

PTL 1: JP 2015-230573 A

SUMMARY OF INVENTION

Technical Problem

However, in PTL 1, the road condition prediction unit predicts the road condition at the forward position which is ahead of the host vehicle position detected (calculated) by the host vehicle position calculation unit 20, based on information acquired using a communication device 7 (paragraph [0026] of PTL 1). Thus, it cannot cope with a case where the communication is interrupted.

Solution to Problem

In order to solve the above-described problem, a vehicle control device of the present invention includes, as an example, automatic driving control means for controlling automatic driving of a vehicle, and map information holding means for holding a detailed map including traveling lane information, in which, in a case where a section in which a detailed map newer than the detailed map held in the map information holding means is not usable is in a traveling scheduled route, the automatic driving control means continues to perform the automatic driving until reaching to a start point of the section, using the detailed map held in the map information holding means.

Advantageous Effects of Invention

According to the present invention, even in a case where a section in which a detailed map necessary for the automatic driving cannot be used is generated due to communication interruption, data corruption, or the like, since automatic traveling is continued in an available range, the driver can switch to manual driving with a margin.

DESCRIPTION OF EMBODIMENTS

Figure 1:
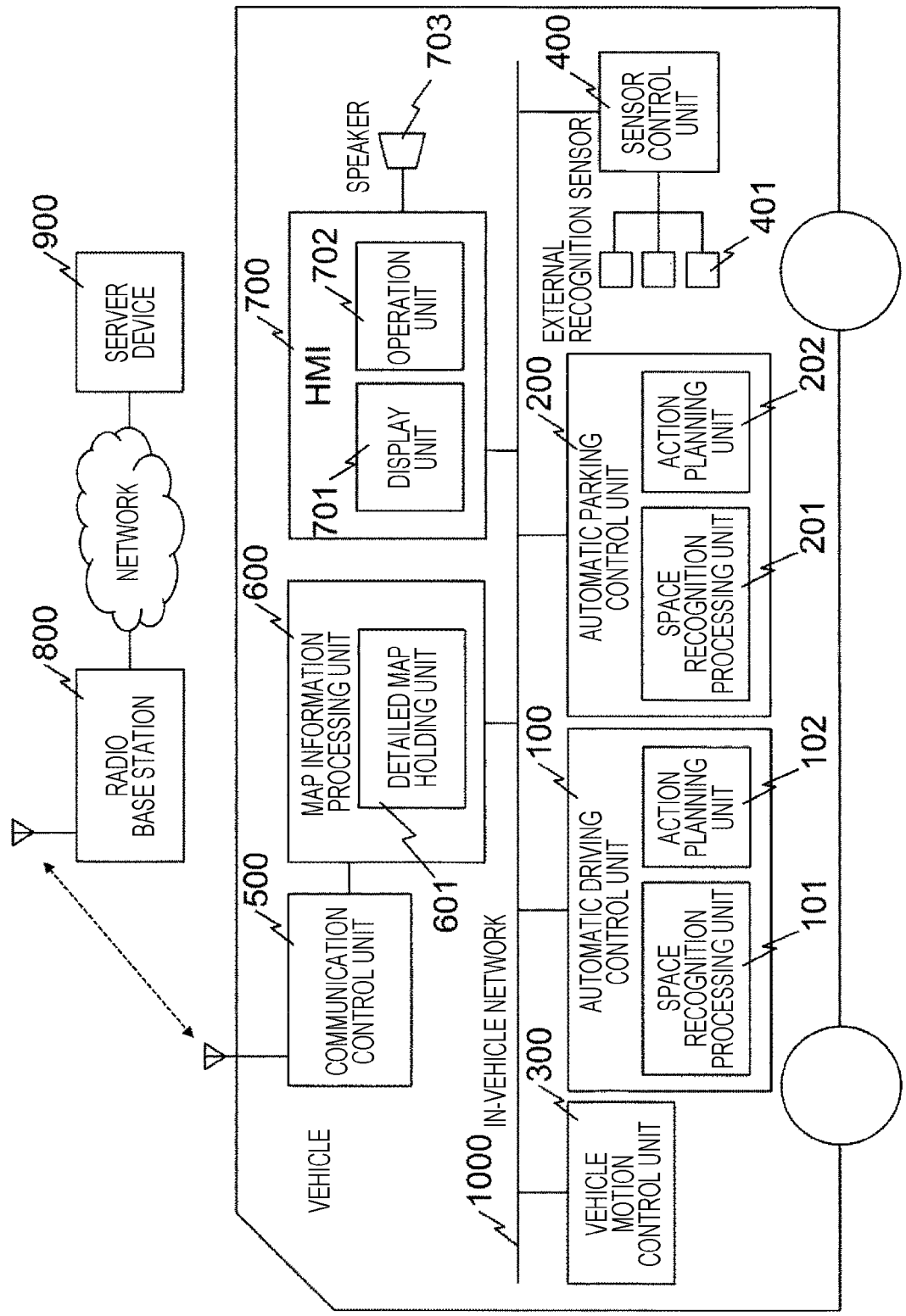
FIG. 1 is a system configuration diagram in an embodiment of the present invention.

In recent automobiles, driving support functions such as emergency automatic braking, preceding vehicle following, and lane keeping are rapidly spreading, and further, the movement toward realization of the automatic driving has become active by applying a technique for realizing these driving support functions.

NHTSA (US National Highway Traffic Safety Administration) classifies automatic driving into four stages according to the degree of automation in "Preliminary Statement of Policy Concerning Automated Vehicles", and currently, this classification is widely used. According to the classification, it is defined one in which operations of acceleration, steering, and braking are individually automated is Level 1; one in which automation is made such that multiple operations of acceleration, steering, and braking cooperate is Level 2; one in which all operations of acceleration, steering, and braking are automated but the driver is required to respond to the request of the system in an emergency or the like is Level 3; and one in which all operations of acceleration, steering, and braking are automated and thus the driver involvement is not required is Level 4.

The above-described driving support function corresponds to Level 1 or Level 2, and many of today's automatic driving vehicles aim to realize a function corresponding to Level 3.

In automatic driving at Level 3 or higher, in addition to the conventional map used in a navigation system, a detailed map in which information such as the number of lanes and the lane shape is recorded is used in order to identify a host vehicle position by the resolution in lane units and to determine a traveling track.

When a traveling track is determined in lane units, information of a detailed map for a traveling scheduled section determined with reference to the conventional map is pre-read to determine, in advance, a lane to be passed through, and when the vehicle approaches a point where a lane change is required, a point where the lane change is actually performed is determined in consideration of information from an external recognition sensor.

However, in consideration of limitation of a capacity of a storage device on the vehicle side and reflection of the latest information, it is not realistic to hold the detailed maps relating to all roads on the vehicle side in advance.

For this reason, an aspect is assumed in which the detailed map in which the latest information regarding all roads is reflected is stored in a server device on the ground side, and on the vehicle side, the latest detailed map for a required site is sequentially acquired from the server device via a radio communication line.

In the aspect in which the required detailed map is sequentially acquired via the radio communication line, if communication is interrupted because the radio wave does not reach the road on which the vehicle is traveling, it becomes impossible to newly acquire the detailed map, and the latest detailed map cannot be used in some sections of the route in which traveling is performed by automatic driving.

Alternatively, there is a possibility that the detailed map cannot be used in some sections of the travel route because the data of the detailed map data held by the vehicle is damaged even if the sequential acquisition of the detailed map by the radio communication is not performed.

In a case where the latest detailed map cannot be used, it becomes impossible to identify the host vehicle position and to determine the lane to be passed through by prereading the information of the detailed map.

For this reason, in a scene where it is necessary to travel on a specific lane, such as turning to the left or right, or diverging/merging, a vehicle control is required to be performed such that identification of the host vehicle position, determination of the traveling track, and further following the determined track are performed by referring to external recognition information only after the corresponding point is approached.

However, with the current processing capacity of sensors for detection range, external recognition, and route generation, the above processing may not be performed in time.

As described above, if a section in which the latest detailed map cannot be used is present on the route in which traveling is performed by automatic driving, the automatic driving may be difficult in the section.

In the automatic driving vehicle at Level 3, in a case where the automatic driving is difficult, it is preferable to switch to manual driving by the driver.

However, if the automatic driving is immediately terminated at a time point when it is detected that there is a section where the latest detailed map cannot be used, or a time point when the vehicle enters a section where the latest detailed map cannot be used, since the driver is not ready to perform manual driving, there is a possibility that appropriate driving operation may not be performed immediately.

Based on the above, embodiments of the present invention will be described below.

First Embodiment

A first embodiment of the present invention will be described using FIGS. 1 to 3.

FIG. 1 is a system configuration diagram according to a first embodiment of a vehicle control device of the present invention, an automatic driving control unit (automatic driving control means) 100, an automatic parking control unit 200, a vehicle motion control unit 300, a sensor control unit 400, a communication control unit 500, a map information processing unit 600, and a human machine interface (hereinafter, referred to as HMI) 700 which are mounted on the vehicle side, and a radio communication base station 800 and a server device 900 which are installed on the ground side are included.

Among the functional units on the vehicle side, the automatic driving control unit 100, the automatic parking control unit 200, the vehicle motion control unit 300, the sensor control unit 400, the map information processing unit 600, and the HMI (information presentation means) 700 are connected to an in-vehicle network 1000.

Each of these functional units can communicate with other functional units via the in-vehicle network 1000.

The automatic driving control unit 100 includes a space recognition processing unit 101 and an action planning unit 102. The space recognition processing unit 101 obtains the position of the obstacle around the vehicle, the shape of the road, the number of lanes, and the speed limit by integrating the information from the sensor control unit 400 and the information of the detailed map input from the map information processing unit 600 and holds the result.

The action planning unit 102 calculates a target track and a target vehicle speed with reference to the recognition result in the space recognition processing unit 101, and outputs the target track and the target vehicle speed to the vehicle motion control unit 300.

The automatic parking control unit 200 includes a space recognition processing unit 201 and an action planning unit 202.

The space recognition processing unit 201 recognizes the position of the obstacle around the vehicle and the shape of the road by integrating the information from the sensor control unit 400 and holds the result, and in a case where a parking available space is detected, the space recognition processing unit 201 holds the position.

The action planning unit 202 calculates target track and a vehicle speed with reference to the recognition result and the target parking position in the space recognition processing unit 201, and outputs the target track and the vehicle speed to the vehicle motion control unit 300.

Since the automatic driving control unit 100 and the automatic parking control unit 200 are different in types of external recognition sensors as input information sources, presence or absence of using the detailed map, generations methods of a target track, speed ranges of the vehicle, and the like, bur have roughly similar configurations and operations, the automatic driving control unit 100 and the automatic parking control unit 200 may be realized as the same control unit.

The vehicle motion control unit 300 controls an engine, a motor, a transmission, a brake, a steering, and the like using the target track and the target vehicle speed input from the automatic driving control unit 100 and the automatic parking control unit 200.

The sensor control unit 400 controls an external recognition sensor 401, converts an input from the external recognition sensor 401 into a predetermined format, and transmits the input to the automatic driving control unit 100 or the automatic parking control unit 200.

The external recognition sensor 401 is a device for detecting an external space of a vehicle, an obstacle, or an indicator on a road surface. Specifically, a camera, a sonar, a radar, or a combination thereof can be considered as the external recognition sensor 401, but the type is not limited in the present invention.

The communication control unit (communication status monitoring means) 500 performs radio communication with the radio communication base station 800. In addition, t communication control unit 500 monitors interruption of radio communication and recovery from the interruption, and in a case where interruption or recovery is detected, the communication control unit 500 notifies the automatic driving control unit 100 of the information.

The detailed map is transmitted from the server device 900 to the map information processing unit 600 via the radio communication base station 800 and the communication control unit 500.

The HMI 700 includes a display unit 701, an operation unit 702, and a speaker 703. A driver or a passenger sets a destination and instructs start and end of automatic driving via the operation unit 702. Further, the HMI 700 receives notification information for the driver from the automatic driving control unit 100, and displays the content on the display unit 701 or issues an alarm sound or voice guidance from the speaker 703.

Next, an operation of the automatic driving in the first embodiment of the present invention will be described.

When the driver sets a destination and instructs the start of the automatic driving using the HMI 700, the automatic driving control unit 100 creates a route plan and notifies the map information processing unit 600 of the route plan while holding the route plan by itself.

Figure 2:
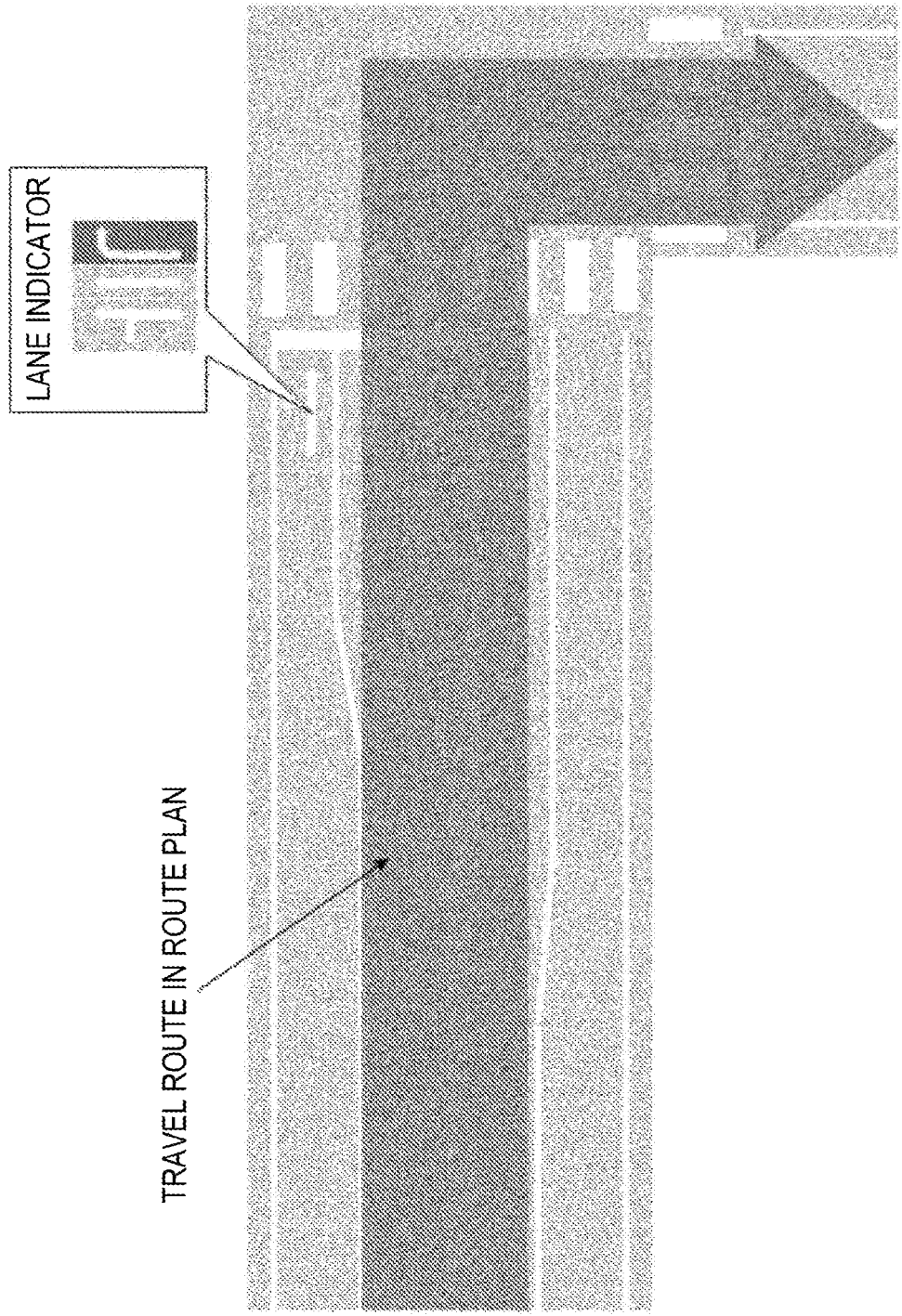
FIG. 2 is a schematic diagram of a route plan.

Here, the route plan includes information on roads and sections to travel as schematically illustrated in FIG. 2. In the route plan, roads are represented without distinction of lanes, but for points where turning to the left or right, or diverging/merging is required, information on the lane to travel is included.

The map information processing unit 600 checks whether a detailed map holding unit 601 holds the detailed map of the route notified from the automatic driving control unit 100.

In a case where the detailed map holding unit 601 does not hold the detailed map of the route notified from the automatic driving control unit 100, the map information processing unit 600 requests transmission of the corresponding detailed map from the server device 900, and the server device 900 transmits the requested detailed map to the map information processing unit 600.

The map information processing unit 600 stores the detailed map received from the server device 900 in the detailed map holding unit 601.

In a case where the detailed map holding unit (map information holding means) 601 holds the detailed map of the route notified from the automatic driving control unit 100, the map information processing unit 600 inquires of the server device 900 about the latest version number (including, for example, version information or codes) of the detailed map of the route notified from the automatic driving control unit 100, and the server device 900 transmits the latest version number of the detailed map about which the inquiry is received to the map information processing unit 600.

Next, the map information processing unit compares whether or not the version number of the detailed map held in the detailed map holding unit 601 matches the latest version number received from the server device 900.

In a case where the version number of the detailed map held in the detailed map holding unit 601 does not match the latest version number, the map information processing unit 600 requests transmission of the detailed map of the corresponding latest version number from the server device 900, and the server device 900 transmits the requested detailed map to the map information processing unit 600. Here, the information transmitted from the server device 900 may be the detailed map of the latest version number itself, or may be a difference between the detailed map of the latest version number and the detailed map held in the detailed map holding unit 601.

The map information processing unit 600 stores the detailed map of the latest version number received from the server device 900 in the detailed map holding unit 601.

In a case where the version number of the detailed map held in the detailed map holding unit 601 matches the latest version number, since it is a state where the acquisition of the detailed map of the latest version number has been completed, the map information processing unit 600 does not perform an operation for acquiring a detailed map.

Here, if a distance from a departure point to the destination is long, a lot of detailed maps are required, and if all of the detailed maps are acquired at one time, the data capacity may exceed the upper limit by which the detailed map holding unit 601 can store data.

In such a case, the map information processing unit 600 acquires the detailed map of the latest version up to the middle of the route, and acquires the detailed map of the latest version number corresponding to the remaining section, from the server device 900 until reaching an end point of the section for which acquisition of the detailed map of the latest version number is completed during traveling.

As described above, when the preparation for the automatic driving is completed, the automatic driving is performed by periodically repeating the following procedure.

The map information processing unit 600 reads a detailed map for a predetermined range around the current location from the detailed map holding unit 601 and transmits the detailed map to the automatic driving control unit 100. Further, the map information processing unit 600 creates a lane plan using the route plan notified from the automatic driving control unit 100 and the above-described detailed map read from the detailed map holding unit 601, and transmits the lane plan to the automatic driving control unit 100.

Figure 3:
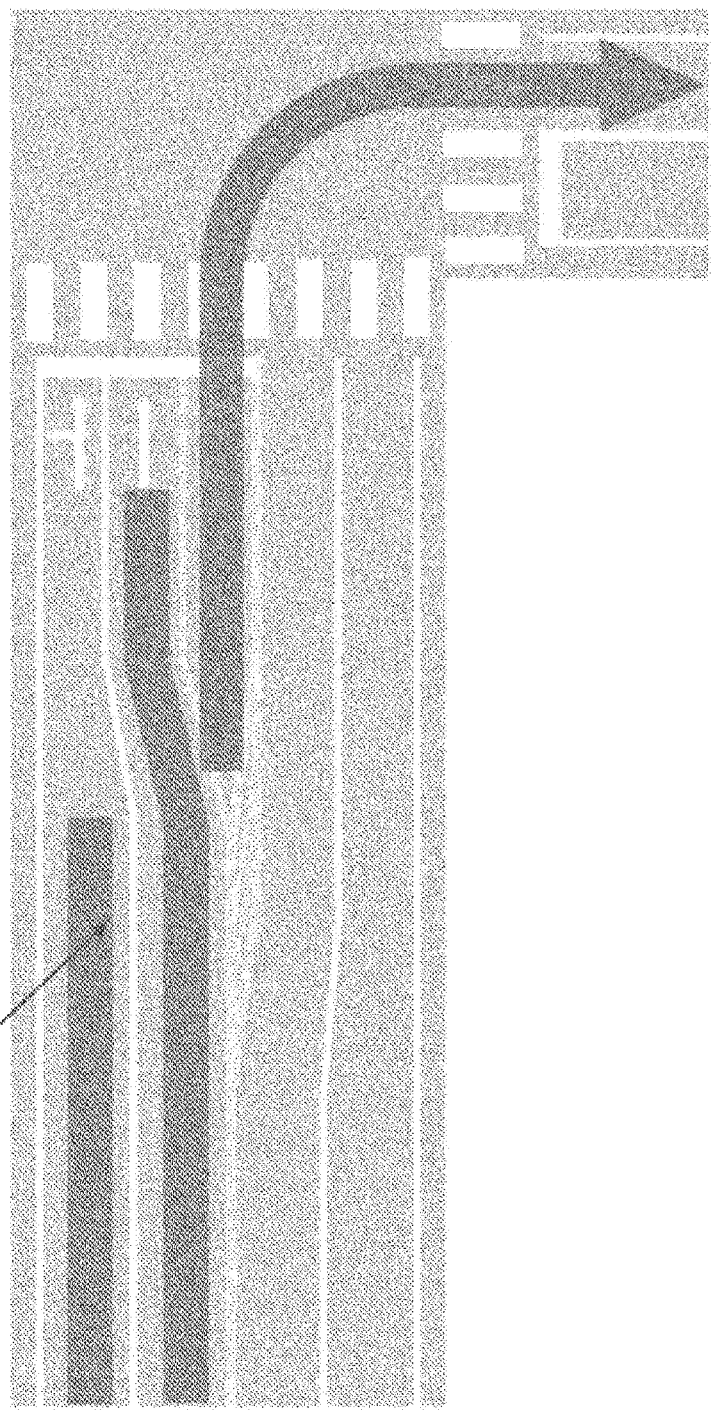
FIG. 3 is a schematic diagram of a lane plan.

Here, as schematically illustrated in FIG. 3, the lane plan includes candidates for lanes to travel for each section, but a specific point where a lane change is to be made is not determined.

On the other hand, the sensor control unit 400 transmits the distance from the vehicle to the obstacle, which is measured by the external recognition sensor 401, to the automatic driving control unit 100.

The automatic driving control unit 100 recognizes the position of the obstacle around the vehicle, the shape of the road, the number of lanes, and the speed limit using the information relating to the distance from the vehicle to the obstacle input from the sensor control unit 400, and the detailed map input from the map information processing unit 600.

Next, the automatic driving control unit 100 calculates a target track and a target vehicle speed with reference to the recognition result and the lane plan input from the map information processing unit 600, and transmits the target track and the target vehicle speed to the vehicle motion control unit 300.

Figure 4:
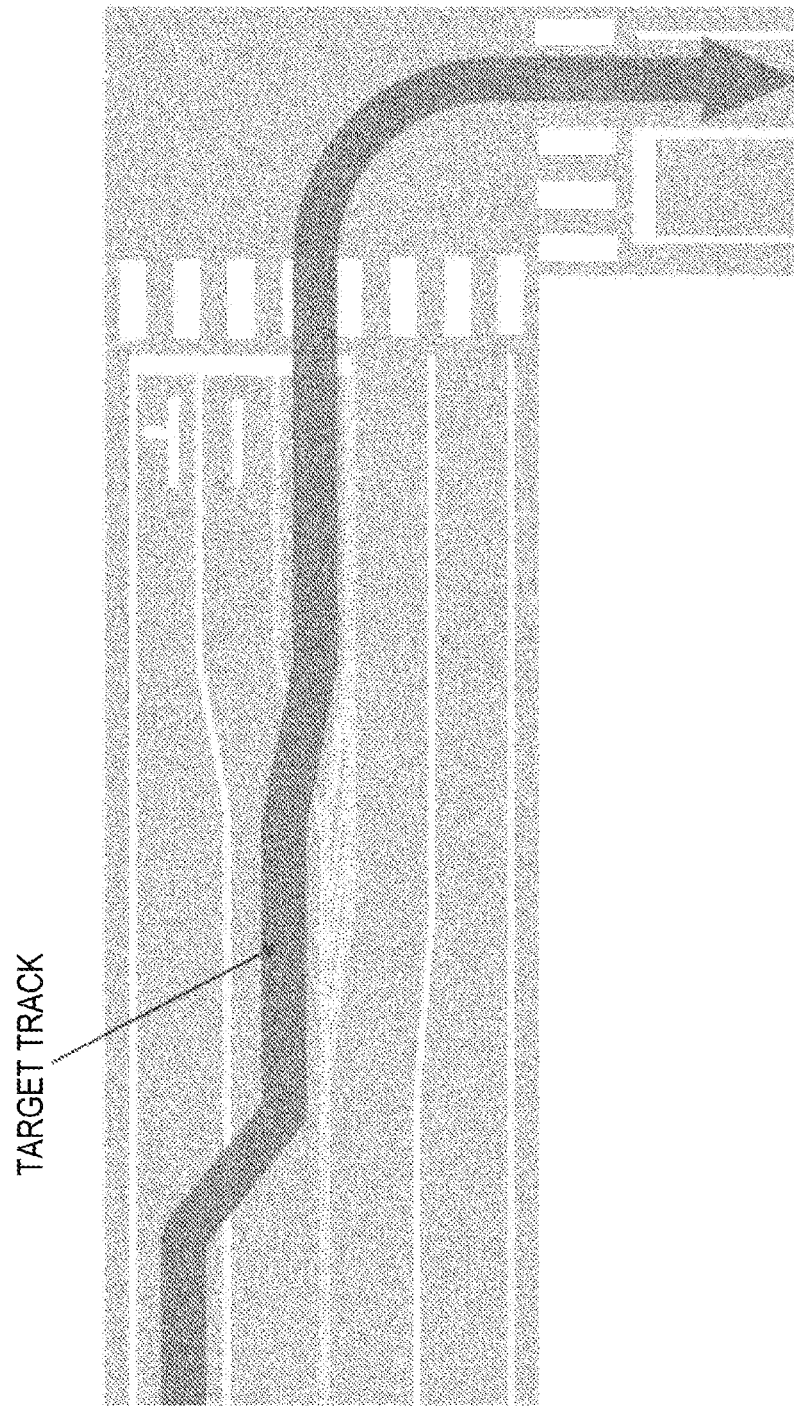
FIG. 4 is a schematic diagram of a target track.

Here, as schematically illustrated in FIG. 4, the target track includes a lane where the vehicle is to travel and a point where the lane change is to be made.

The vehicle motion control unit 300 controls an engine, a motor, a transmission, a brake, a steering, and the like using the target track and the target vehicle speed input from the automatic driving control unit 100.

During the traveling by the automatic driving, when the communication control unit 500 detects the interruption of the radio communication in a state where the map information processing unit 600 acquires only the detailed map of the latest version number up to the middle of the route, the communication control unit 500 notifies the automatic driving control unit 100 of the communication interruption.

The automatic driving control unit 100 determines whether or not continuation of the automatic driving is possible and performs a preparation operation for automatically stopping when continuation is not possible.

Figure 5:
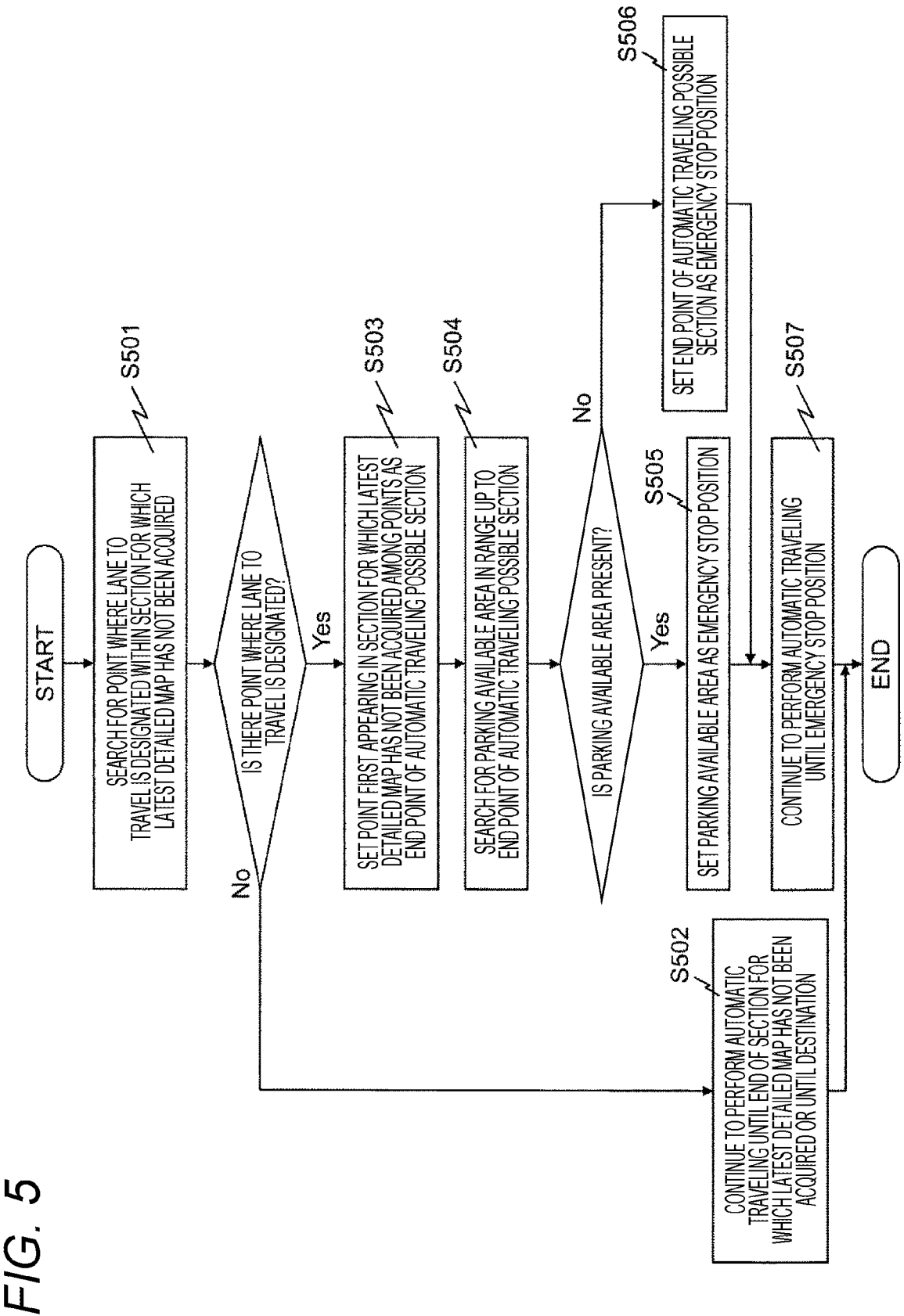
FIG. 5 is a flowchart illustrating a determination on whether or not continuation of automatic driving possible and a preparation operation for automatically stopping when continuation is not possible.

Hereinafter, the operation will be described in detail using the flow chart illustrated in FIG. 5.

When the automatic driving control unit 100 recognizes that the acquisition of the detailed map has failed by the notification of the communication interruption from the communication control unit 500, and searches for a point where the lane to travel for turning to the left or right, or diverging/merging is designated with the section for which the detailed map of the latest version number has not been acquired as the target, by referring to the route plan (S501).

In step S501, in a case where the corresponding point is not present, the automatic driving control unit 100 determines that the automatic traveling is possible while maintaining the lane, in all the sections for which the detailed map of the latest version number has not been acquired, and continues to perform the automatic traveling until the end of the section for which the detailed map of the latest version number has not been acquired or until the destination (S502).

In step S503, in a case where the corresponding point is present, the automatic driving control unit 100 determines that the automatic traveling is possible while maintaining the lane until the point first appearing in the section for which the detailed map of the latest version number has not been acquired, among the points, and sets the point as an end point of an automatic traveling possible section (S503).

Next, the automatic driving control unit 100 searches for a parking available area in a range up to the end point of the automatic traveling possible section by referring to available map information so that the vehicle can be automatically stopped after the automatic driving is continued to the vicinity of the above-described end point at the maximum (S504).

Here, the available map information includes a map with a low degree of detail used for creating a route plan, and a detailed map including the detailed map which is not the latest version, held in the detailed map holding unit 601. In addition, the parking available area includes an emergency parking zone or a service area of a highway, a parking area, a parking lot facing a general road, and the like.

In S504, if one or more parking available areas are present, the automatic driving control unit 100 sets all the searched parking available areas as emergency stop positions (S505).

At this time, if a plurality of searched parking available areas are present, priorities are assigned in order of proximity to the current location.

Hereinafter, for convenience, the plurality of emergency stop positions will be described as a first emergency stop position, a second emergency stop position, and the like in descending order of priority.

In S504, if the parking available areas is not present, the automatic driving control unit 100 sets the end point of the automatic traveling possible section as the first emergency stop position (S506).

After setting the emergency stop position according to the above-described procedure, the automatic driving control unit 100 determines to continue to perform t automatic traveling until the first emergency stop position (S507).

In a case where the automatic driving control unit 100 determines to continue to perform the automatic traveling until the emergency stop position in S507, the automatic driving control unit 100 calculates a required time from the current location to the first emergency stop position.

Figure 6:
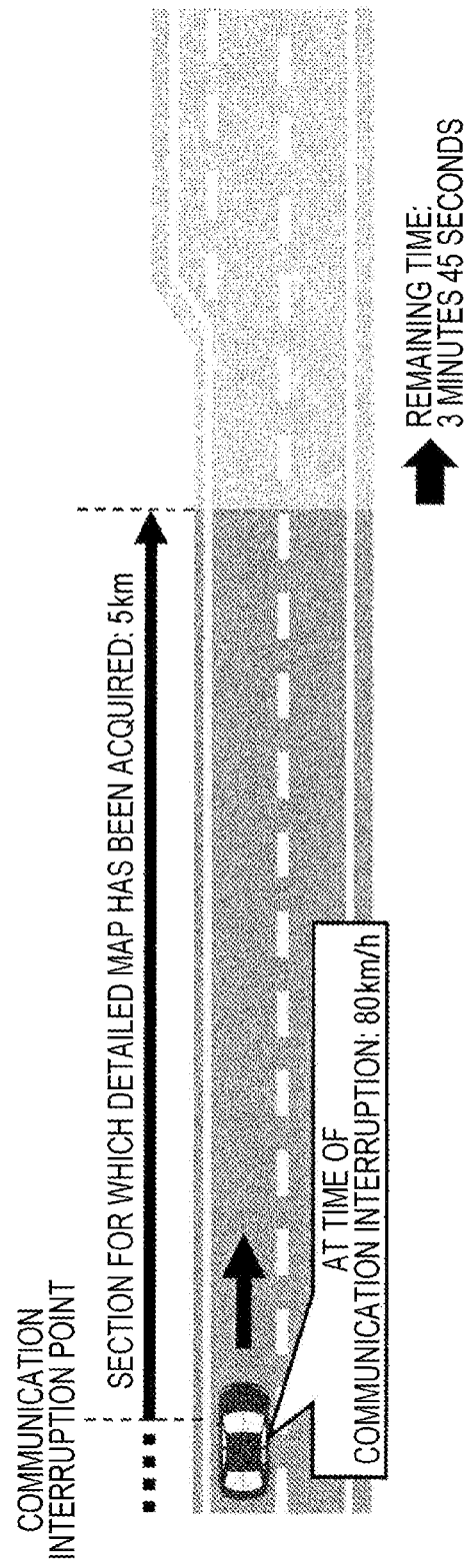
FIG. 6 is a schematic diagram illustrating a first method for calculating a remaining time for continuation of the automatic driving after interruption of a radio communication is detected.

Specifically, as illustrated in FIG. 6, a method of dividing a distance from the current location to the first emergency stop position by the vehicle speed at the time of detecting the interruption of the radio communication considered.

Figure 7:
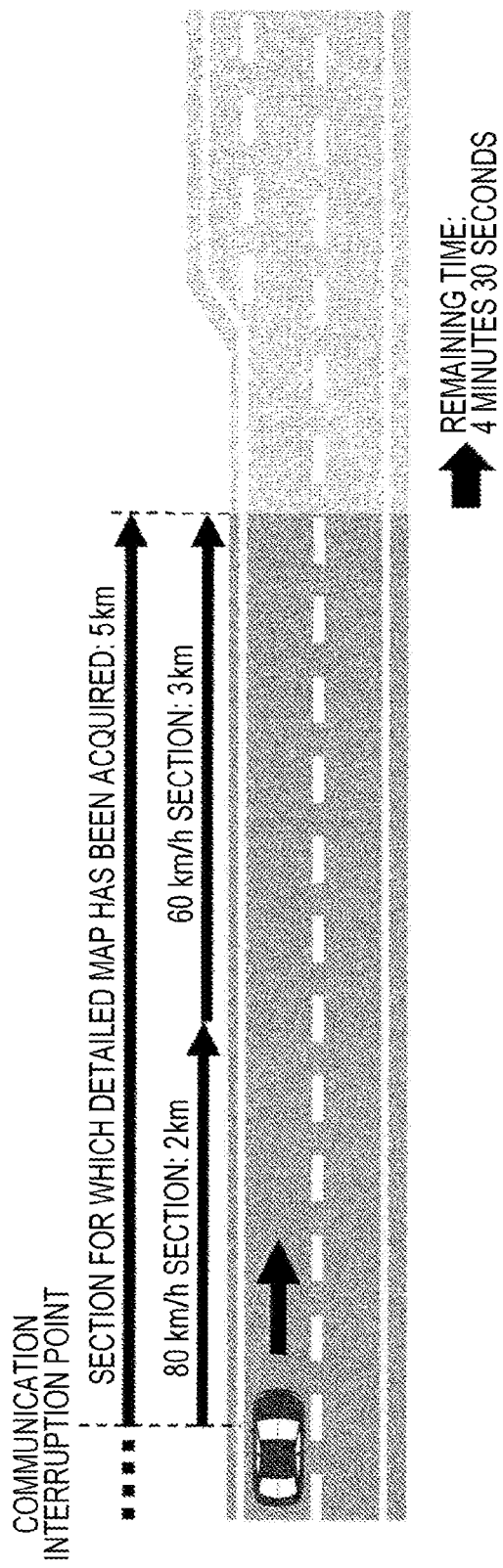
FIG. 7 is a schematic diagram illustrating a second method for calculating a remaining time for continuation of the automatic driving after interruption of a radio communication is detected.

Alternatively, as illustrated in FIG. 7, based on the plan created by the action planning unit 102, an area from the current location to the first emergency stop position is divided into a plurality of small sections, and numbers obtained by dividing the distances of the small sections by vehicle speeds planned in the corresponding small sections may be added up.

The automatic driving control unit 100 sets the required time obtained as described above as the remaining time until the end of the automatic traveling, and continues to perform the automatic traveling.

Here, according to the procedure of determining a section in which the automatic traveling is continued, illustrated in S501 to S507, in the section, a section for which acquisition of the detailed map of the latest version number is completed and a section for which the detailed map of the latest version number has not been acquired are mixed.

Among the sections, in the section for which the acquisition of the detailed map of the latest version number is completed, normal automatic driving is performed using the detailed map.

Meanwhile, in the section for which the detailed map of the latest version number has not been acquired, automatic traveling is performed while maintaining the lane.

At this time, the automatic driving control unit 100 identifies the host vehicle position with reference to the available map information.

In addition, the automatic driving control unit 100 recognizes a lane and a preceding vehicle using information input from the external recognition sensor 401, calculates a target track so that the host vehicle stays in the lane, and calculates the target vehicle speed so that the distance from the preceding vehicle is maintained at a predetermined value or more.

Next, the automatic driving control unit 100 transmits, to the HMI 700, the remaining time until the end of the automatic traveling calculated above, and an instruction to issue an alarm prompting the driver to switch to the manual driving.

The HMI 700 issues an alarm prompting the driver to switch to the manual driving within the remaining time based on the received remaining time and the received instruction.

As the alarm, specifically, a method of displaying a message and the remaining time on the display unit 701 and reducing the remaining time as the time elapses, or a method of periodically issuing an alarm sound or voice guidance from the speaker 703 may be considered, but the method is not limited in the present invention.

Further, after the remaining time until the end of the automatic traveling is calculated, the automatic driving control unit 100 starts monitoring the presence or absence of the switching operation to the manual driving by the driver, and continues to perform the monitoring until the remaining time expires.

Here, as the switching operation to the manual driving by the driver, an instruction to end the automatic driving via the operation unit 702 of the HMI 700 or an operation of an accelerator pedal, a brake pedal, or the steering wheel is considered, but the type of the switching operation is not limited in the present invention.

In a case where the switching operation to the manual driving is detected before the remaining time expires, the automatic driving control unit 100 ends the automatic traveling.

In addition, the automatic driving control unit 100 ends monitoring the presence or absence of the switching operation to the manual driving by the driver, and transmits an instruction to release an alarm for the driver, to the HMI 700.

When the HMI 700 receives an instruction to release an alarm for the driver, the HMI 700 stops the alarm that is issued.

In a case where the remaining time until the end of the automatic traveling has expired while the switching operation to the manual driving is not detected, the automatic driving control unit 100 automatically stops the vehicle.

Figure 8:
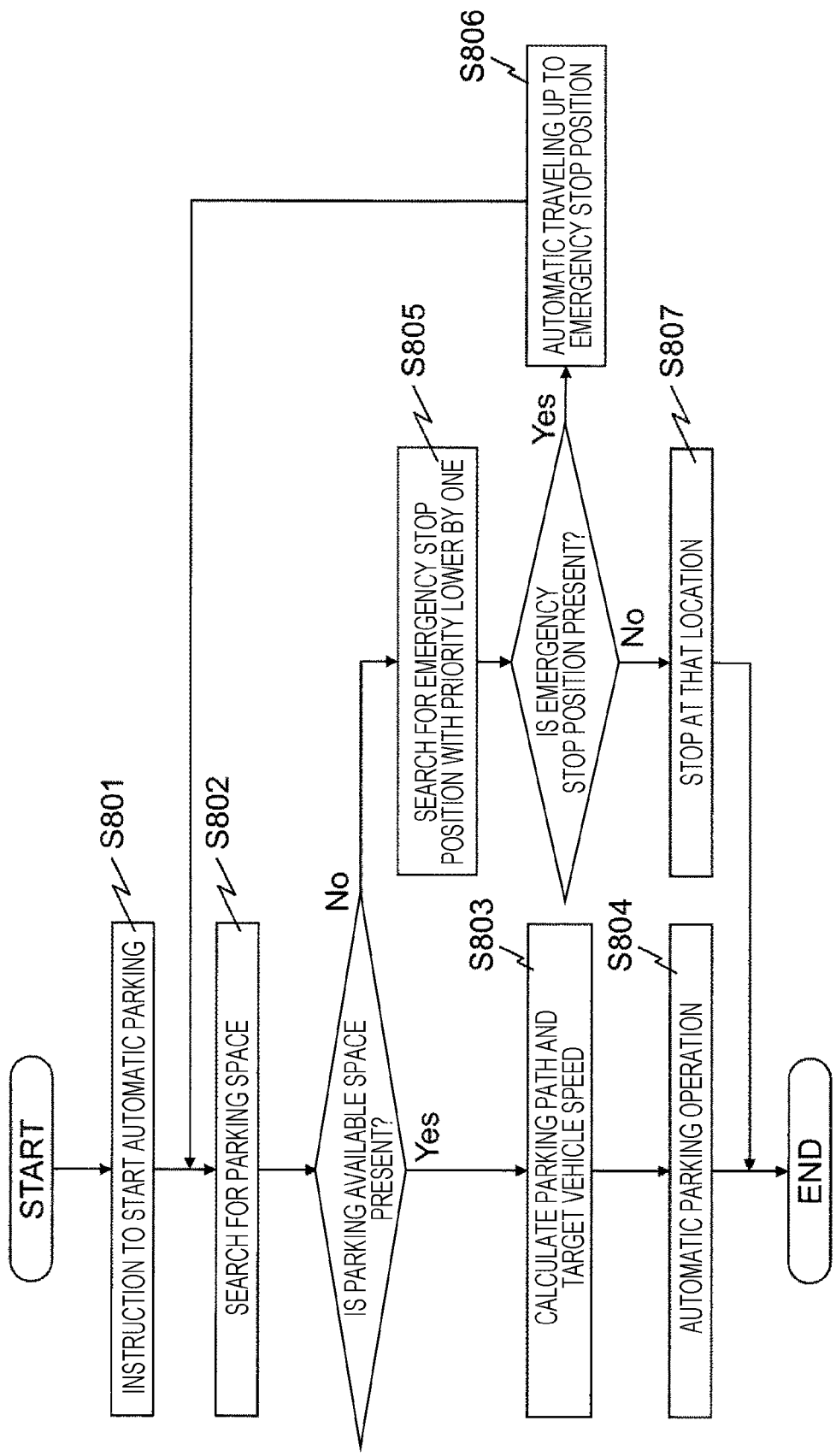
FIG. 8 is a flowchart illustrating an operation when the remaining time until the automatic traveling ends has expired.

Hereinafter, the operation will be described in detail using the flow chart illustrated in FIG. 8.

When the remaining time until the end of the automatic traveling expires, the automatic driving control unit 100 transmits an instruction to start automatic parking to the automatic parking control unit 200 (S801).

At this time point, the host vehicle is in the vicinity of the first emergency stop position.

The automatic parking control unit 200 searches for a parking available space at the first emergency stop position based on the information input from the external recognition sensor 401 (S802).

At this time, the automatic parking control unit 200 blinks a hazard lamp of the host vehicle in order to alert the following vehicle.

In a case where the parking available space is detected, the automatic parking control unit 200 sets the detected parking space as the target parking position, calculates a parking path and a target vehicle speed (S803), and notifies the vehicle motion control unit 300 of the parking path and the target vehicle speed.

The vehicle motion control unit 300 controls the vehicle speed and the steering angle according to the parking path and the target vehicle speed input from the automatic parking control unit 200, and performs a parking operation in the detected parking available space (S804).

Meanwhile, if the parking available space is not present because another vehicle is at a standstill, the automatic parking control unit 200 notifies the automatic driving control unit 100 that there is no parking available space.

In this case, the automatic driving control unit 100 searches for an emergency stop position with a priority lower by one (S805).

If the emergency stop position with a priority lower by one is set, the automatic traveling is performed up to the corresponding point while maintaining the lane (S806), and after reaching the point, the procedure after S802 is repeated.

If the emergency stop position with a priority lower by one is not set, the vehicle is stopped at that location (S807).

After the communication control unit 500 detects the interruption of the radio communication once, in a case where the communication control unit 500 detects the recovery from the interruption of the radio communication before the switching operation to the manual driving is detected, the automatic driving control unit 100 ends monitoring the presence or absence of the switching operation to the manual driving by the driver, and transmits an instruction to release an alarm for the driver, to the HMI 700.

When the HMI 700 receives an instruction to release an alarm for the driver, the HMI 700 stops the alarm that is issued.

In a case where the communication control unit 500 detects the recovery from the interruption of the radio communication after the switching operation from the automatic driving to the manual driving is detected, the automatic driving control unit 100 causes the manual driving by the driver to return to the automatic driving which was being performed before the switching to the manual driving.

In the first embodiment of the present invention, even in a case where continuation of the automatic driving is difficult due to the communication interruption, since the automatic traveling is continued in a section in which traveling is possible while the lane is maintained among the section for which the detailed map of the latest version number has been acquired and the section for which the detailed map of the latest version number has not been acquired, and the remaining time until the end of the automatic traveling is notified, the driver can switch to the manual driving with a margin.

In addition, even in a case where switching to the manual driving cannot be performed, the vehicle can be automatically stopped by searching for a location where parking can be easily performed in the vicinity of the end point of the section in which continuation of the automatic traveling is possible, in advance and setting the emergency stop position.

Furthermore, since the driving automatically returns to the automatic driving in a case where the radio communication is recovered, the burden of the manual driving on the driver is minimized.

Second Embodiment

A second embodiment of the present invention will be described.

The system configuration of the second embodiment of the vehicle control device according to the present invention is the same as that of the first embodiment illustrated in FIG. 1, and is different from the first embodiment in that a function of notifying the automatic driving control unit 100 that there is an abnormality in the data of the detailed map in a case where there is an abnormality in the data of the detailed map is added to the map information processing unit 600.

As described in the first embodiment, when the destination is set by the driver and an instruction to start the automatic driving is issued, the automatic driving control unit 100 notifies the map information processing unit 600 of the route plan.

When the map information processing unit 600 is notified of the route plan by the automatic driving control unit 100, the map information processing unit 600 reads, from the detailed map holding unit 601, the detailed map for a route notified by the automatic driving control unit 100. At this time, the map information processing unit 600 checks whether or not there is an abnormality such as corruption or falsification in the read data of the detailed map by using a verification code included in the detailed map.

In a case where there is the above-described abnormality in the data of the detailed map, the map information processing unit 600 notifies the automatic driving control unit 100 of the fact that the abnormality has occurred in reading the detailed map, and the corresponding section.

When the automatic driving control unit 100 receives the above-described notification from the map information processing unit 600, the automatic driving control unit 100 determines whether or not continuation of the automatic driving is possible and performs a preparation operation for automatically stopping when continuation is not possible.

The "section for which acquisition of the detailed map of the latest version number is completed" and the "section for which the detailed map of the latest version number has not been acquired" in the operation when the interruption of the radio communication is detected in the first embodiment are respectively replaced with a "section for which the reading of the detailed map is normally completed" and a "section for which an abnormality occurs in the reading of the detailed map" in the subsequent operation of the automatic driving control unit 100.

In the second embodiment of the present invention, even in a case where there is an abnormality such as corruption or falsification of data in the detailed map held in the vehicle, since the automatic traveling is continued in a section in which traveling is possible while the lane is maintained among the section for which the reading of the detailed map is normally completed and the section for which an abnormality occurs in the reading of the detailed map, and the remaining time until the end of the automatic traveling is notified, the driver can switch to the manual driving with a margin.

According to the above-described embodiments, with the following configuration, even in a case where a section in which a detailed map necessary for the automatic driving cannot be used is generated due to communication interruption, data corruption, or the like, since automatic traveling is continued in an available range, the driver can switch to manual driving with a margin.

For example, automatic driving control means for controlling automatic driving of a vehicle, and map information holding means for holding a detailed map including traveling lane information are provided. In a case where a section in which a detailed map newer than the detailed map held in the map information holding means is not usable is in a traveling scheduled route, the automatic driving control means continues to perform the automatic driving until reaching to a start point of the section, using the detailed map held in the map information holding means.

In addition, in the section in which the new detailed map is not usable, the automatic driving control means continues to perform the automatic driving in a range from the start point of the section to an end point of a lane maintaining available section in which traveling is performed while the lane is maintained.

In addition, when the section in which the new detailed map is not usable is detected on the traveling scheduled route during the automatic driving, the automatic driving control means searches for a point where a traveling lane is designated in the section by referring to the detailed map held in the map information holding means, and in a case where the point is present as a result of the searching, the automatic driving control means sets the point that the vehicle first reaches as the end point of the lane maintaining available section.

In addition, in a case where the point is not present as a result of the searching, the automatic driving control means continues to perform the automatic driving in the section in which the new detailed map is not usable.

In addition, the automatic driving control means searches for a stop available position in a range up to the end point of the lane maintaining available section on the traveling scheduled route by using the detailed map held in the map information holding means, in a case where the stop available position is present as a result of the searching, the automatic driving control means sets the stop available position as an emergency stop position, and in a case where the stop available position is not present, the automatic driving control means sets the end point of the lane maintaining available section as the emergency stop position.

In addition, the automatic driving control means calculates a required time from a current position of the vehicle to the emergency stop position, and sets a time obtained by subtracting the calculated value from a predetermined value as a remaining time for continuing the automatic driving.

In addition, information presentation means for presenting information to a driver is provided. In a case where the automatic driving control means detects the section in which the new detailed map is not usable on the traveling scheduled route during the automatic driving, the information presentation means presents, to the driver, information for prompting switching from the automatic driving to manual driving by the driver within the remaining time.

In addition, in a case where an operation of switching from the automatic driving to the manual driving is not detected within the remaining time, the automatic driving control means stops the vehicle at the emergency stop position.

In addition, communication status monitoring means for monitoring interruption of a communication line and a recovery from the interruption provided. The communication status monitoring means determines that the section in which the new detailed map is not usable occurs by detecting a predetermined number of interruption of the communication line within a predetermined time.

In addition, the automatic driving control means continues to perform the automatic driving in a case where the communication status monitoring means detects the recovery of the communication line within the remaining time.

In addition, in a case where the communication line status monitoring means detects the recovery of the communication line after the switching to the manual driving is completed, the automatic driving control means performs a control such that the manual driving returns to the automatic driving that was being performed before the switching to the manual driving.

In addition, in the section in which the new detailed map is not usable, the automatic driving control means 100 may be configured to continue to perform the automatic driving in a range from the start point of the section to an end point of a lane maintaining available section in which traveling is performed while the lane is maintained, in cooperation with a known navigation map installed in a known car navigation system, a known map application for electronic terminals, and road guidance information. That is, in the section in which the new detailed map is not usable, the automatic driving control means 100 may configured to continue to perform the automatic driving by referring to route guidance information for the vehicle.

REFERENCE SIGNS LIST

100 automatic driving control unit (automatic driving control means)
101 space recognition processing unit
102 action planning unit 200 automatic parking control unit
201 space recognition processing unit
202 action planning unit
300 vehicle motion control unit
400 sensor control unit
401 external recognition sensor
500 communication control unit (communication status monitoring means)
600 map information processing unit
601 detailed map holding unit (map information holding means)
700 human machine interface (HMI, information presentation means)
701 display unit
702 operation unit
703 speaker
800 radio communication base station
900 server device
1000 in-vehicle network

The invention claimed is:

1. A vehicle control device comprising:
an automatic driving controller configured to control automatic driving of a vehicle; and
a detailed map memory configured to hold a detailed map including traveling lane information,
wherein, in a case where a section in which a detailed map newer than the detailed map held in the detailed map memory is not usable is in a traveling scheduled route, the automatic driving controller continues to perform the automatic driving until reaching to a start point of the section, using the detailed map held in the detailed map memory,
wherein, when the section in which the new detailed map is not usable is detected on the traveling scheduled route during the automatic driving, the automatic driving controller searches for a point where a traveling lane is designated in the section by referring to the detailed map held in the detailed map memory,
wherein, in a case where the point is present as a result of the searching, the automatic driving controller sets the point that the vehicle first reaches as the end point of the lane maintaining available section, and
wherein, in a case where the point is not present as a result of the searching, the automatic driving controller continues to perform the automatic driving in the section in which the new detailed map is not usable.

2. The vehicle control device according to claim 1,
wherein, in the section in which the new detailed map is not usable, the automatic driving controller continues to perform the automatic driving in a range from the start point of the section to the end point of the lane maintaining available section in which traveling is performed while the lane is maintained.

3. The vehicle control device according to claim 1,
wherein the automatic driving controller searches for a stop available position in a range up to the end point of the lane maintaining available section on the traveling scheduled route by using the detailed map held in the map detailed map memory,
in a case where the stop available position is present as a result of the searching, the automatic driving controller sets the stop available position as an emergency stop position, and
in a case where the stop available position is not present, the automatic driving controller sets the end point of the lane maintaining available section as the emergency stop position.

4. The vehicle control device according to claim 3,
wherein the automatic driving controller calculates a required time from a current position of the vehicle to the emergency stop position, and sets a time obtained by subtracting the calculated value from a predetermined value as a remaining time for continuing the automatic driving.

5. The vehicle control device according to claim 4, further comprising:
a human machine interface for presenting information to a driver,
wherein, in a case where the automatic driving controller detects the section in which the new detailed map is not usable on the traveling scheduled route during the automatic driving, the human machine interface presents, to the driver, information for prompting switching from the automatic driving to manual driving by the driver within the remaining time.

6. The vehicle control device according to claim 5,
wherein, in a case where an operation of switching from the automatic driving to the manual driving is not detected within the remaining time, the automatic driving controller stops the vehicle at the emergency stop position.

7. The vehicle control device according to claim 5, further comprising:
a communication control unit for monitoring interruption of a communication line and a recovery from the interruption,
wherein the communication control unit determines that the section in which the new detailed map is not usable occurs by detecting a predetermined number of interruption of the communication line within a predetermined time.

8. The vehicle control device according to claim 7,
wherein the automatic driving controller continues to perform the automatic driving in a case where the communication control unit detects the recovery of the communication line within the remaining time.

9. The vehicle control device according to claim 7,
wherein, in a case where the communication control unit detects the recovery of the communication line after the switching to the manual driving is completed, the automatic driving controller performs a control such that the manual driving returns to the automatic driving that was being performed before the switching to the manual driving.

10. The vehicle control device according to claim 1,
wherein, in the section in which the new detailed map is not usable, the automatic driving controller continues to perform the automatic driving in a range from the start point of the section to an end point of a lane maintaining available section in which traveling is performed while the lane is maintained, by referring to route guidance information for the vehicle.

11. A method of controlling automatic driving using the vehicle control device of claim 1, comprising:
holding, by the vehicle control device, detailed map information in memory, including traveling lane information,
in a case where a section in which a detailed map newer than the detailed map being held is not usable is in a traveling scheduled route, causing, by the vehicle control device, automatic driving to be performed until reaching to a start point of the section, using the detailed map that is being held, in response to detecting the section in which the new detailed map is not usable on the traveling scheduled route during the automatic driving, searching for, by the vehicle control device, a point where a traveling lane is designated in the section by referring to the detailed map that is held, in a case where the point is present as a result of the searching, setting, by the vehicle control device, a point that the vehicle first reaches as an end point of a lane maintaining available section in which traveling is performed while the lane is maintained, and in a case where the point is not present as a result of the searching, continuing to perform, by the vehicle control device, the automatic driving in the section in which the new detailed map is not usable.

* * * * *